United States Patent
Olivotto

[15] 3,670,866
[45] June 20, 1972

[54] CONVEYOR DEVICES

[72] Inventor: Vanfrido Olivotto, Via Carlo Capelli 85, Turin, Italy

[22] Filed: March 8, 1971

[21] Appl. No.: 121,640

[30] Foreign Application Priority Data

March 23, 1970 Italy..................................67985 A/70

[52] U.S. Cl.........................................................198/33 AC
[51] Int. Cl.............................................................B65g 47/24
[58] Field of Search........................198/33 R, 33 AC, 33 AB; 131/25

[56] References Cited

UNITED STATES PATENTS 3,061,071  10/1962  Roehrbein.........................198/33 AC
3,363,743  1/1968  Pfeiffer.....................................198/41

Primary Examiner—Richard E. Aegerter
Attorney—Sughrue, Rothwell, Mion, Zinn & Macpeak

[57] ABSTRACT

A conveyor for elongate objects particularly glass tubes is disclosed. The conveyor is adapted to turn the tubes through 90° so that, while still travelling in the same direction they change from an orientation in line with the direction of movement to an orientation transverse the direction of movement. The conveyor includes a chain mounted on two parallel sprockets one above the other, and carrying a plurality of movable supports which are free to rotate over a limited range about a substantially vertical axis. The movable supports lift the objects in their initial orientation, rotate through 90° guided by guide members as they are lifted by the chain, and transfer the glass tubes to another conveyor, moving parallel to the production line, in their new orientation transverse the direction of movement of the conveyor.

2 Claims, 4 Drawing Figures

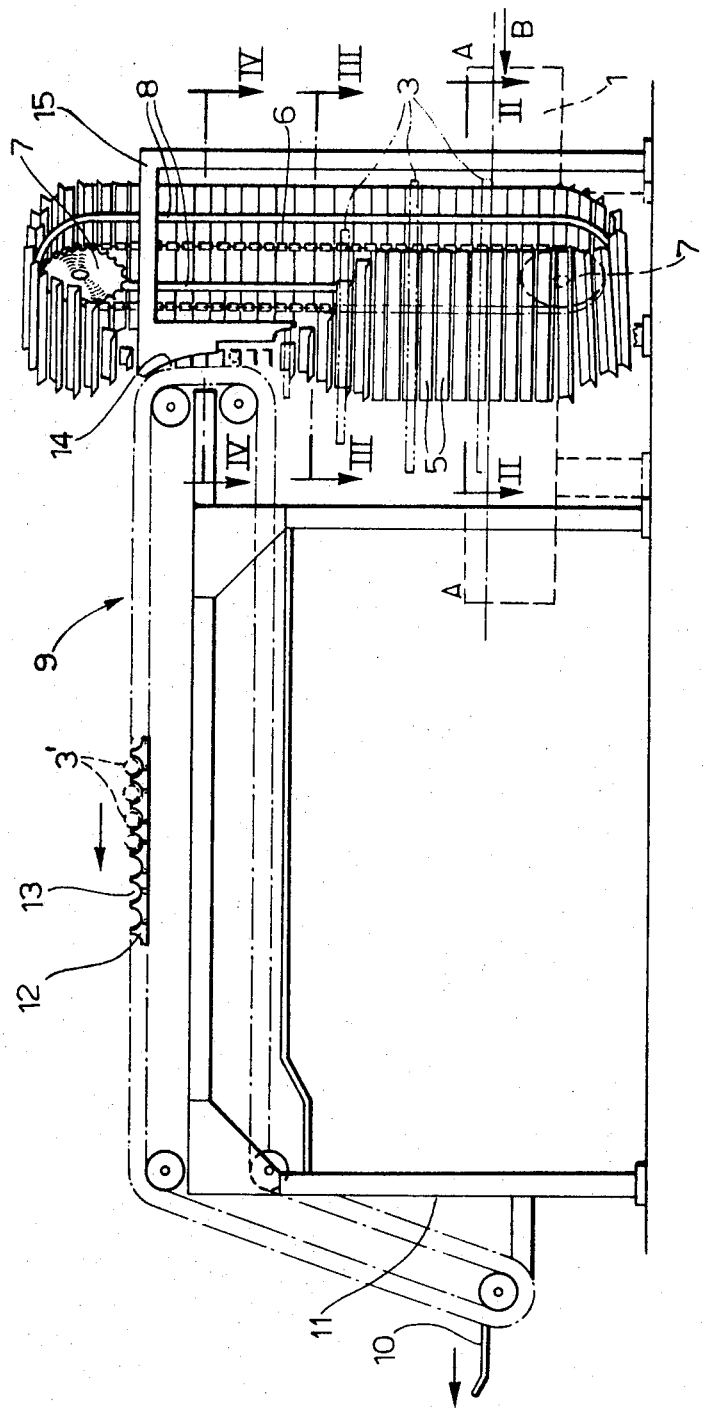

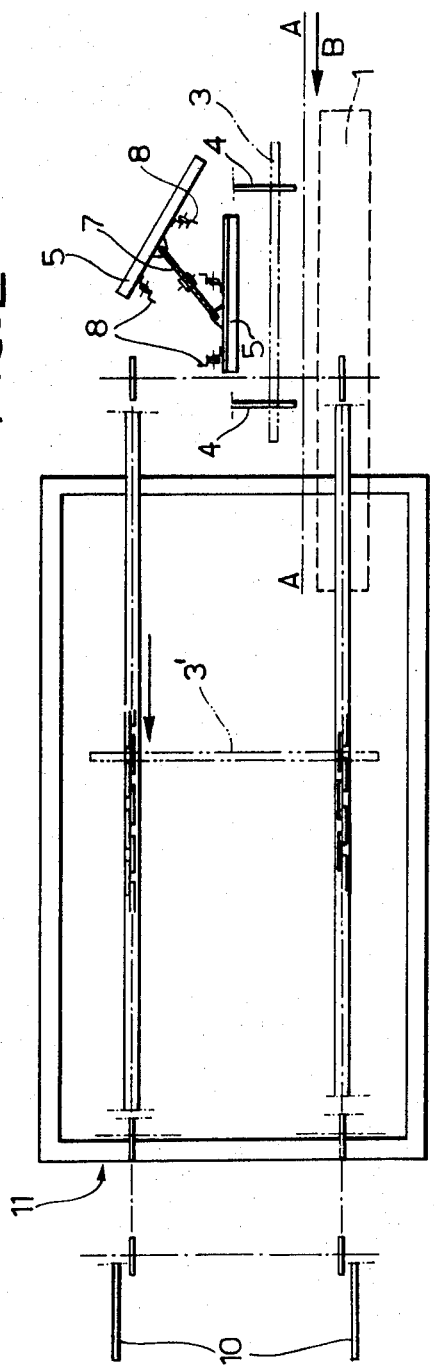
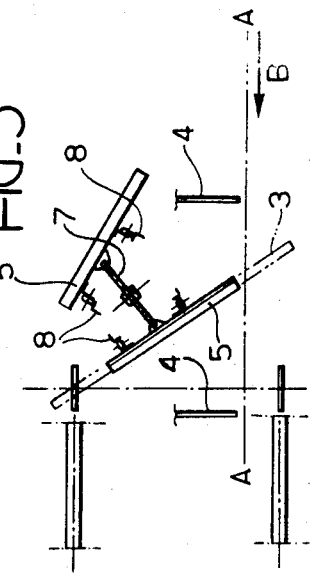
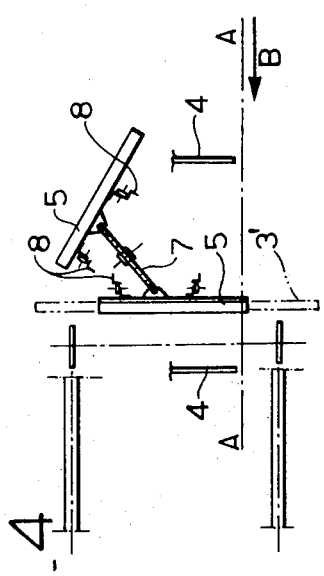

CONVEYOR DEVICES

BACKGROUND OF THE INVENTION

The present invention relates to a conveyor device for the transfer of elongate objects such as glass tubes, for use at the end of a continuous production line of such objects.

During the production of glass tubes, which is frequently achieved at high speed on one or more production lines arranged side by side, a series of successive operations are carried out on the tubes; the tubes are axially aligned with the direction of travel between successive operations, and the operations are performed on the tubes whilst they are in this orientation. These operations take the tubes from the furnace to a position where, in cut lengths, they may be collected in bundles by a gathering device.

However, these operations, performed along the production line can be followed by further operations which, because of their nature, are preferably performed with the tubes placed transverse the direction of movement of the tubes. If the tubes were maintained in the same orientation as when they reach the gathering device each production line would become L-shape and therefore, when there are a plurality of production lines arranged side by side from the same blast-furnace, the lay-out would be distorted which would mean a considerable waste of space.

SUMMARY OF THE INVENTION

According to the present invention there is provided a conveyor device for the transfer of elongate objects such as glass tubes, for use at the end of a continuous production line, and including a continuous elevator which comprises a chain carried between two substantially parallel toothed wheels lying one above the other and at 45° with respect to the direction of movement of the objects at the end of the production line, a plurality of movable supports for the objects, mounted on the chain so as to be free to rotate relative to the chain over a limited range in substantially horizontal planes, and two guides which determine the angular position of the movable supports along the chain, the guides being so shaped that the movable supports are substantially parallel to the objects at a position adjacent the point where the objects leave the production line, and are rotated through 90° about a substantially vertical axis coincident with the chain as they travel up the elevator to a position where the objects are transferred, in use of the conveyor, to a horizontal transporter extending parallel to the end of the production line.

Such a conveyor device is capable of removing the tubes as they reach the end of the production line, rotating them through 90° about a substantially vertical axis and delivering them to the machines which are to perform the aforementioned subsequent successive operations, the tubes being now sufficiently cooled during the transfer.

It will be appreciated that embodiments of this invention can be used for the installation of closely flanked production lines, without requiring a great waste of space.

Advantageously, the horizontal transporter is arranged at such a height that there is space for people to pass underneath it.

BRIEF DESCRIPTION OF THE DRAWINGS

One embodiment of the present invention will now be more particularly described, by way of example, with reference to the accompanying drawings, in which:

FIG. 1 is a schematic side view in elevation of one embodiment of a device for the transfer of glass tubes constructed in accordance with the present invention, illustrated at the end of a continuous production line, and FIG. 2, 3, and 4 are respectively schematic cross sections of the device taken on the lines II—II, III—III, and IV—IV respectively of FIG. 1.

DESCRIPTION OF THE PREFERRED EMBODIMENT

Referring now to FIG. 1 there is shown, schematically, and indicated by the reference numeral 1, the end of a continuous-production line of glass tubes 3, the production line moves in the direction shown by the line A—A, and the glass tubes 3 move in the direction of the arrow B and are aligned with their axes parallel to the line A—A. The tubes 3 are removed from the group at the end of the production line and placed on two parallel supports 4, located transverse the axes of the tubes 3.

The tubes 3 are removed from the support 4 by movable supports 5 which are formed by lengths of material having a channel of angular cross section. The movable supports 5 are mounted by connection of their middle part to a continuous roller-chain 6, which passes over two substantially parallel toothed wheels 7, which are spaced, one above the other and lie at approximately 45° with respect to the direction of movement of the production line and thus of the tubes.

The movable supports 5, mounted on the chain 6 at their middle parts, can rotate about an axis formed by the chain 6 and are guided by two guides 8 which determine the angular position of the movable supports 5 as they move around the loop formed by the chain. The guides 8 are themselves each in the form of an elongate loop and are disposed one each side of the loop formed by the chain 6.

The guides 8 are shaped so as to cause the movable supports 5 to take up a different orientation in various different positions spaced around the loop of the conveyor.

In a position adjacent the end 1 of the production line the guides 8 are so shaped that the movable supports 5 are placed substantially parallel to the tubes 3 as they come off the end 1 of the production line so that the tubes 3 are engaged one at a time by a respective one of the movable supports 5 and lifted upwards. As the movable supports 5 travel upwards from the position where the tubes 3 are engaged the guides 8 cause them to rotate about a substantially vertical axis until they each take up a new orientation in which the tubes are arranged at 90° to their initial orientation.

The sequence of the angular orientations of the movable supports 5, and thus the tubes 3 is illustrated in FIGS. 2, 3, and 4 which respectively show the tubes at the position of departure from the end 1 of the production line, in an intermediate position on the way up the conveyor, and in the position near the top of the conveyor where the tubes 3 have achieved their final orientation.

At the upper end of the conveyor, where the tubes are rotated at 90° to their initial orientation, the tubes are removed by a continuous horizontal transporter 9, comprising two parallel chains 12 with notches 13 which convey them to a collection point 10 from which they are conveyed to the machines which are to perform the further operations. The advancement of the chains 12 of the horizontal transporter is synchronized with the advancement of the chain 6 of the lifting conveyor and with the speed of the production line. The tubes 3 are transferred from their engagement by the movable supports 5 to engagement with the notches 13 of the chains 12 by their contact with the curving face 14 of a guide 15.

From the collection point 10 the tubes 3 proceed, in transverse alignment for the successive operations, towards the calibrating, dividing, heading machines and similar until they reach the packing machines.

The lifting of the tubes 3 by the lifting conveyor chain 6 allows the horizontal branches of the transporter 9 to be of such a height as to allow the passage of people underneath; to this end, as illustrated in FIG. 1, the notched chains 12 are supported by a carrying frame 11 below which it is possible for people to pass.

Although a preferred embodiment of this invention has been illustrated and described it will be understood that many variations and modifications can be made without departing from the spirit and scope of this invention.

I claim:

1. A conveyor device for the transfer of elongate objects, for use at the end of a continuous production line, said conveyor including a continuous elevator comprising, a chain, two substantially parallel toothed wheels carrying said chain, said toothed wheels lying one above the other and at 45° with respect to the direction of movement of said objects at the end of said production line, a plurality of movable supports for said objects, said plurality of movable supports being mounted on said chain and free to rotate relative to said chain over a limited range in substantially horizontal planes, two guides determining the angular position of said movable supports along said chain, said guides being shaped so that said movable supports are guided to be substantially parallel to said objects at a position adjacent the point where said objects leave said production line, and are rotated through 90° about a substantially vertical axis coincident with said chain as they travel up said elevator to a position where said objects are transferred, in use of said conveyor, to a horizontal transporter extending parallel to the end of said production line.

2. The conveyor device of claim 1 wherein said transfer of said objects takes place at such a height that there is sufficient space for people to pass under said transporter which carries said objects.

* * * * *